United States Patent
Kuehner et al.

(10) Patent No.: US 12,539,864 B2
(45) Date of Patent: Feb. 3, 2026

(54) CAUSING A VIBRATION WITHIN A VEHICLE TO CHANGE A DEGREE OF SOMNOLENCE OF AN OCCUPANT OF THE VEHICLE

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven By Toyota, Inc., Tokyo (JP)

( * ) Notice: Subject to any disclaimer, the term of this patent is extended or adjusted under 35 U.S.C. 154(b) by 108 days.

(21) Appl. No.: 18/129,613

(22) Filed: Mar. 31, 2023

(65) Prior Publication Data

US 2024/0326824 A1 Oct. 3, 2024

(51) Int. Cl.
*B60W 40/08* (2012.01)
*B60W 40/06* (2012.01)
*B60W 60/00* (2020.01)

(52) U.S. Cl.
CPC .......... *B60W 40/08* (2013.01); *B60W 40/06* (2013.01); *B60W 60/0013* (2020.02); *B60W 2420/408* (2024.01); *B60W 2540/043* (2020.02); *B60W 2540/26* (2013.01)

(58) Field of Classification Search
CPC .. B60W 40/08; B60W 60/0013; B60W 40/06; B60W 2540/043; B60W 2420/408; B60W 2540/26
See application file for complete search history.

(56) References Cited

U.S. PATENT DOCUMENTS

| | | | |
|---|---|---|---|
| 7,845,722 B1 | 12/2010 | Manenti et al. | |
| 7,904,221 B2 | 3/2011 | Oikawa et al. | |
| 2003/0209893 A1* | 11/2003 | Breed | B60N 2/267 |
| | | | 701/45 |
| 2010/0231014 A1 | 9/2010 | Gibree et al. | |

(Continued)

FOREIGN PATENT DOCUMENTS

| | | | |
|---|---|---|---|
| JP | 2019038356 A | | 3/2019 |
| JP | 2019211878 A | * | 12/2019 |

OTHER PUBLICATIONS

JP2019211878A machine translation (Year: 2019).*

(Continued)

*Primary Examiner* — Navid Z. Mehdizadeh
*Assistant Examiner* — Oliver Tan
(74) *Attorney, Agent, or Firm* — Christopher G. Darrow; Darrow Mustafa PC (57) ABSTRACT

A system for causing a vibration within a vehicle to change a degree of somnolence of an occupant of the vehicle can include a processor and a memory. The memory can store an occupant age discrimination and a controller module. The occupant age discrimination can include instructions that, when executed by the processor, cause the processor to determine that the occupant of the vehicle is a child. The controller module can include instructions that, when executed by the processor, cause the processor to cause, in response to a determination that the occupant is the child, the vehicle to move in a manner to induce the vibration within the vehicle to change the degree of somnolence of the occupant from an undesired state, of the degree of somnolence, to a desired state of the degree of somnolence.

23 Claims, 5 Drawing Sheets

(56) References Cited

U.S. PATENT DOCUMENTS

| | | | |
|---|---|---|---|
| 2016/0174728 A1* | 6/2016 | Karp | A61M 21/02 5/655 |
| 2018/0201254 A1* | 7/2018 | Myers | B60G 17/017 |
| 2021/0155262 A1* | 5/2021 | Kim | G05B 13/027 |
| 2022/0126640 A1 | 4/2022 | Anderson et al. | |
| 2022/0126823 A1* | 4/2022 | Lu | B60W 60/001 |
| 2024/0174241 A1* | 5/2024 | Lee | B60W 50/0098 |

OTHER PUBLICATIONS

Elbanhawi et al., "In the Passenger Seat: Investigating Ride Comfort Measures in Autonomous Cars," IEEE Intelligent Transportation Systems Magazine, vol. 7, No. 3, pp. 4-17, 2015.

Unknown, "Measuring Vibration with Accelerometers," last accessed on Mar. 20, 2023, pp. 1-14, found at https://www.ni.com/en-us/shop/data-acquisition/sensor-fundamentals/measuring-vibration-with-accelerometers.html.

Anne-Marie Gambelin, "It's science: This is why your baby always falls asleep in the car," Aug. 10, 2020, 6 pages, found at https://www.mother.ly/life/why-do-car-rides-put-babies-to-sleep/.

Moniqué Van Der Westhuizen, "Effect of vehicle vibration on healthy term infants: Method and infant car seat vibration quantification," 2020, 125 pages.

Arya et al., "Is the infant car seat challenge useful? A pilot study in a simulated moving vehicle," Archives of Disease in Childhood, Fetal and Neonatal Edition, vol. 102, No. 2, Mar. 2017, pp. F136-F141.

* cited by examiner

CAUSING A VIBRATION WITHIN A VEHICLE TO CHANGE A DEGREE OF SOMNOLENCE OF AN OCCUPANT OF THE VEHICLE

TECHNICAL FIELD

The disclosed technologies are directed to causing a vibration within a vehicle to change a degree of somnolence of an occupant of the vehicle.

BACKGROUND

The Society of Automotive Engineers (SAE) International has specified various levels of driving automation. Specifically, Standard J3016 202104, Taxonomy and Definitions for Terms Related to Driving Automation Systems for On-Road Motor Vehicles, issued by the SAE International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

SUMMARY

In an embodiment, a system for causing a vibration within a vehicle to change a degree of somnolence of an occupant of the vehicle can include a processor and a memory. The memory can store an occupant age discrimination module and a controller module. The occupant age discrimination module can include instructions that, when executed by the processor, cause the processor to determine that the occupant of the vehicle is a child. The controller module can include instructions that, when executed by the processor, cause the processor to cause, in response to a determination that the occupant is the child, the vehicle to move in a manner to induce the vibration within the vehicle to change the degree of somnolence of the occupant from an undesired state, of the degree of somnolence, to a desired state of the degree of somnolence.

In another embodiment, a method for causing a vibration within a vehicle to change a degree of somnolence of an occupant of the vehicle. The method can include determining, by a processor, that the occupant of the vehicle is a child. The method can include causing, by the processor and in response to a determination that the occupant is the child, the vehicle to move in a manner to induce the vibration within the vehicle to change the degree of somnolence of the occupant from an undesired state, of the degree of somnolence, to a desired state of the degree of somnolence.

In another embodiment, a non-transitory computer-readable medium for causing a vibration within a vehicle to change a degree of somnolence of an occupant of the vehicle can include instructions that, when executed by one or more processors, cause the one or more processors to determine that the occupant of the vehicle is a child. The non-transitory computer-readable medium can include instructions that, when executed by the one or more processors, cause the one or more processors to cause, in response to a determination that the occupant is the child, the vehicle to move in a manner to induce the vibration within the vehicle to change the degree of somnolence of the occupant from an undesired state, of the degree of somnolence, to a desired state of the degree of somnolence.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies are directed to causing a vibration within a vehicle to change a degree of somnolence (e.g., sleepiness) of an occupant of the vehicle. The occupant of the vehicle can be determined to be a child. For example, the child can be an infant. In an implementation of the disclosed technologies, in response to an activation of a control element on a user interface, the occupant of the vehicle can be determined to be a child. Additionally or alternatively, for example, in response to a detection, by a sensor, of the occupant within the vehicle, the first occupant of the vehicle can be determined to be a child. For example, the sensor can include one or more of an imaging device (e.g., a camera), a microphone, or the like. For example, if a child safety seat has been installed in the vehicle, then the occupant of the vehicle can be determined to be a child based on a detection of the occupant in the child safety seat. In another implementation of the disclosed technologies, information related to the degree of somnolence of the occupant can be received from a sensor. For example, the sensor can include the one or more of the imaging device (e.g., a camera), the microphone, or the like. The degree of somnolence of the occupant can be determined based on the information. For example, the information can include one or more of information about a position of an eyelid of the occupant, information about a rate of motion of a part of a body of the occupant, information about a degree of loudness of a sound produced by the occupant, or the like. For example, the degree of somnolence of the occupant can be determined based on the information by processing, with a machine learning system, the information. For example, the machine learning system can be trained with training data that include one or more of: (1) known corresponding information associated with an undesired state of the degree of somnolence or (2) known corresponding information associated with a desired state of the degree of somnolence. For example, the undesired state can be awake and the desired state can be asleep. Alternatively, for example, the undesired state can be asleep and the desired state can be awake.

In response to a determination that the occupant is a child, the vehicle can be caused to move in a manner to induce the vibration within the vehicle to change the degree of somnolence of the occupant from the undesired state to the desired state. For example, the vibration induced within the vehicle can be characterized as causing a shakiness within the vehicle. For example, the shakiness can be characterized as a slight and irregular vibration. Alternatively, for example, the shakiness can be characterized as a vibration that has a large amplitude, but a low frequency. For example, the level of driving automation of the vehicle can be level 2 or higher as specified by the Society of Automotive Engineers (SAE) International in Standard J3016 202104, Taxonomy and Definitions for Terms Related to Driving Automation Systems for On-Road Motor Vehicles. For example, the vehicle can be caused to move in the manner to induce the vibration so that a measure of the vibration is greater than a threshold vibration. For example, the occupant can be a specific occupant and the threshold vibration can be a threshold vibration associated with the specific occupant. For example, the vibration can include one or more of: (1) a vibration in a direction along a lateral axis of the vehicle, (2) a vibration in a direction along a longitudinal axis of the vehicle, or (3) a vibration in a direction along a vertical axis of the vehicle. For example, the vehicle can be caused to move in a manner to induce the vibration in the direction along the lateral axis of the vehicle by controlling a steering mechanism of the vehicle to change a degree of variation of a lateral position of the vehicle within a lane. For example, the vehicle can include a lane keeping assist (LKA) system. For example, the vehicle can be caused to move in a manner to induce the vibration in the direction along the longitudinal axis of the vehicle by controlling one or more of an accelerating operator interface or a braking operator interface to change one or more of a rate of acceleration of the vehicle or a rate of deceleration of the vehicle. For example, the vehicle can include an adaptive cruise control (ACC) system. For example, the vehicle can be caused to move in a manner to induce the vibration in the direction along the vertical axis of the vehicle by controlling an accelerating operator interface to increase a speed of the vehicle. Additionally or alternatively, for example, the vehicle can be caused to move in a manner to induce the vibration in the direction along the vertical axis of the vehicle by controlling a trajectory of the vehicle to cause the vehicle to traverse within a first lane rather than within a second lane. For example, the vehicle can include an autonomous driving system. A measure of a roughness of a surface of a road in the first lane can be greater than a measure of the roughness of the surface of the road in the second lane.

Figure 1:
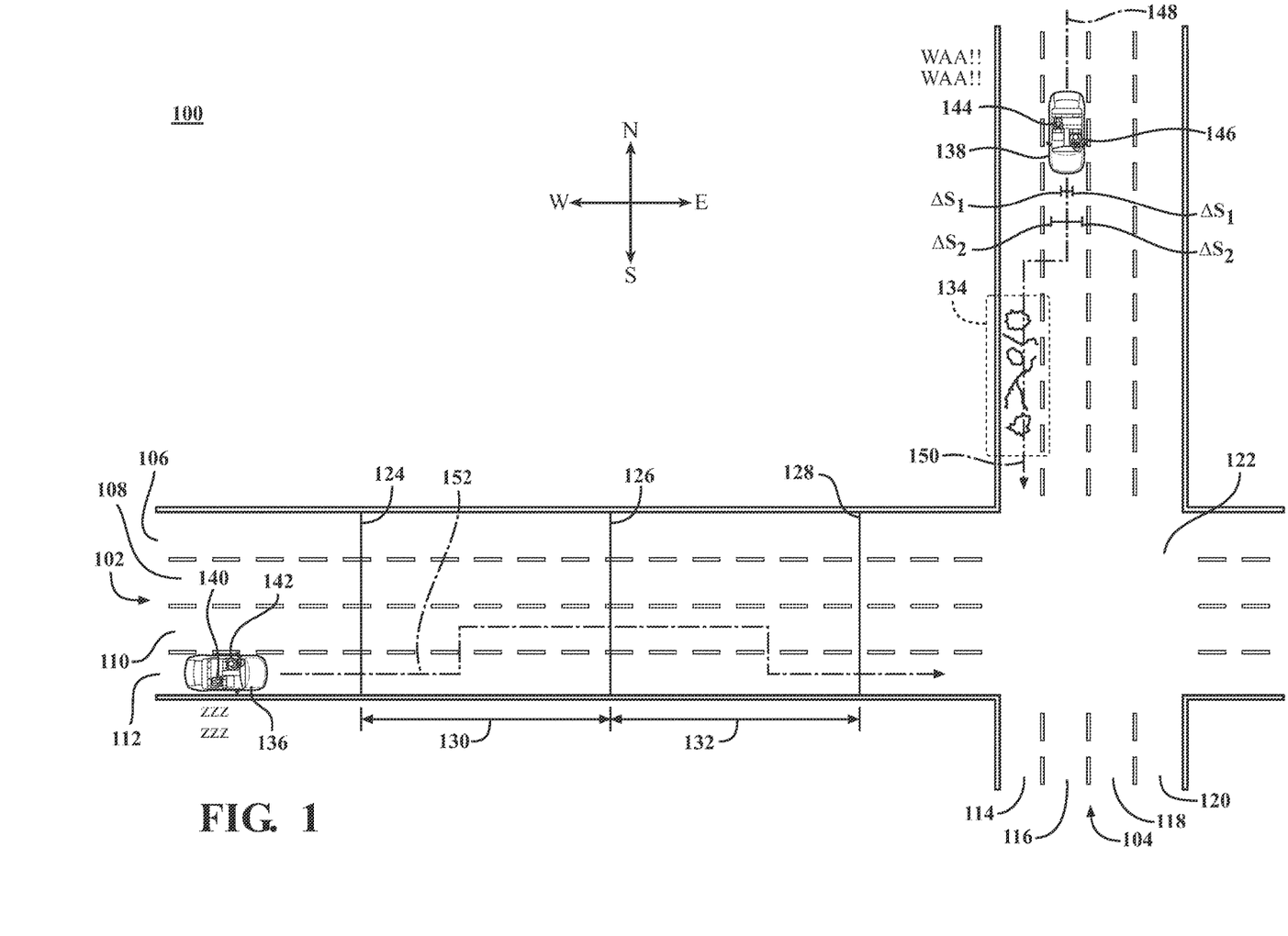
FIG. 1 includes a diagram that illustrates an example of an environment for causing a vibration within a vehicle to change a degree of somnolence of an occupant of the vehicle, according to the disclosed technologies.

FIG. 1 includes a diagram that illustrates an example of an environment 100 for causing a vibration within a vehicle to change a degree of somnolence of an occupant of the vehicle, according to the disclosed technologies. For example, the environment 100 can include a first road 102 (disposed along a line of latitude) and a second road 104 (disposed along a line of longitude). The first road 102 can include, for example, a lane #2 106 for westbound traffic, a lane #1 108 for westbound traffic, a lane #1 110 for eastbound traffic, and a lane #2 112 for eastbound traffic. The second road 104 can include, for example, a lane #2 114 for southbound traffic, a lane #1 116 for southbound traffic, a lane #1 118 for northbound traffic, and a lane #2 120 for northbound traffic. An intersection 122 can be formed by the first road 102 and the second road 104. For example, a surface of the first road 102 can be made of concrete. For example, a first expansion joint 124, a second expansion joint 126, and a third expansion joint 128 can be installed in the surface of the first road 102. For example, a measure of a spacing 130 between the first expansion joint 124 and the second expansion joint 126 can be the same as a measure of a spacing 132 between the second expansion joint 126 and the third expansion joint 128. For example, a surface of the second road 104 can be made of asphalt. For example, a surface of the second road 104 in the lane #2 114 can have surface deteriorations 134. For example, the surface deteriorations 134 can include potholes, crocodile cracking, ruts or the like. For example, the environment 100 can include a first vehicle 136 and a second vehicle 138. For example, the first vehicle 136 can be located in the lane #2 112. For example, Alice 140 can be a first occupant of the first vehicle 136 and Bob 142 can be a second occupant of the first vehicle 136. For example, Alice 140 can be an infant. For example, Bob 142 can be an operator of the first vehicle 136. For example, the second vehicle 138 can be located in the lane #1 116. For example, Carol 144 can be a first occupant of the second vehicle 138 and Dave 146 can be a second occupant of the second vehicle 138. For example, Carol 144 can be a child about two years in age. For example, Dave 146 can be an operator of the second vehicle 138.

Figure 2:
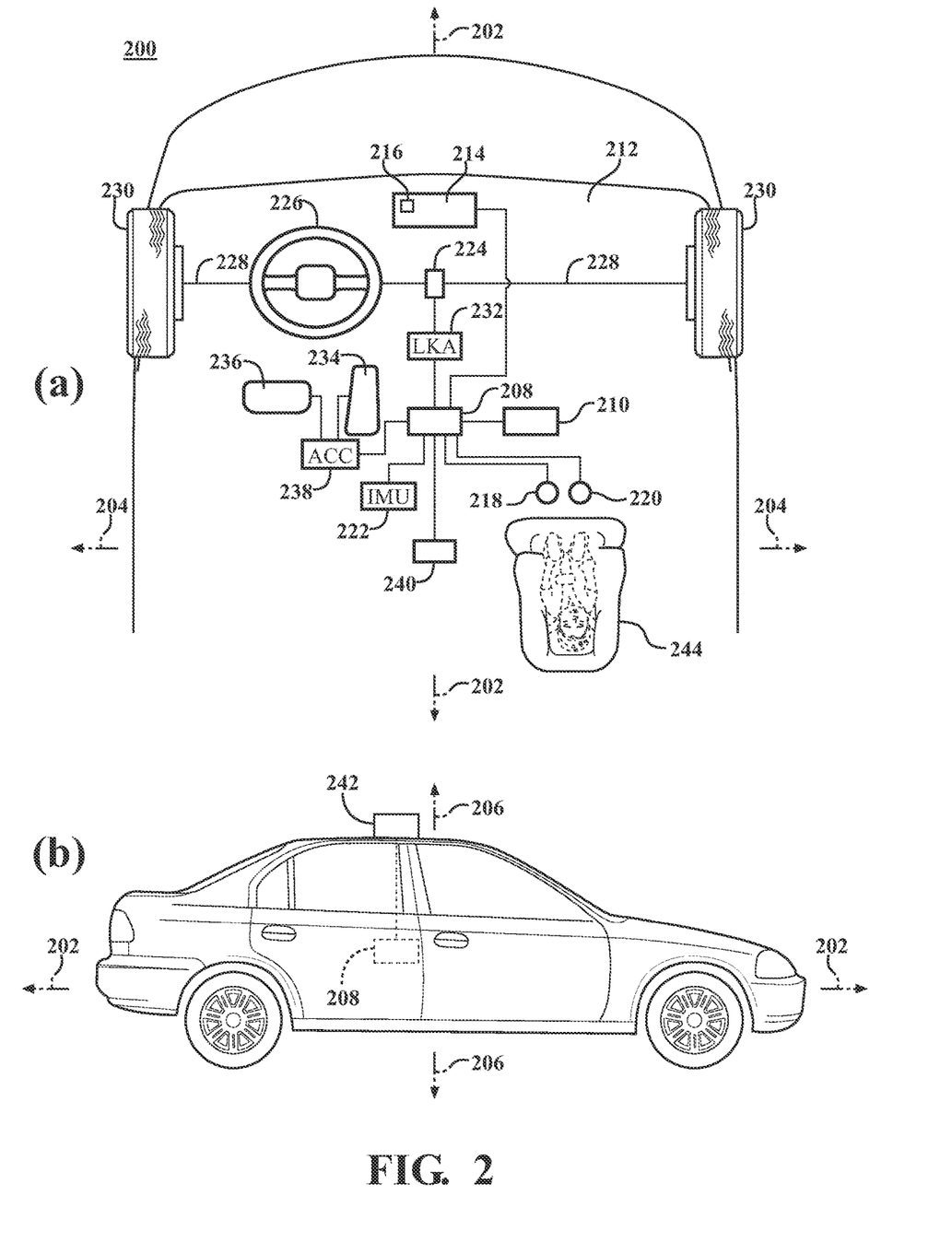
FIG. 2 includes a diagram that illustrates an example of a vehicle which can be configured to cause a vibration within the vehicle to change a degree of somnolence of an occupant of the vehicle, according to the disclosed technologies.

FIG. 2 includes a diagram that illustrates an example of a vehicle 200 which can be configured to cause a vibration within the vehicle 200 to change a degree of somnolence of an occupant of the vehicle 200, according to the disclosed technologies. A view (a) of FIG. 2 is a diagram of the vehicle 200 from a perspective of a plane defined by a longitudinal axis 202 of the vehicle 200 and a lateral axis 204 of the vehicle 200. A view (b) of FIG. 2 is a diagram of the vehicle 200 from a perspective of a plane defined by the longitudinal axis 202 of the vehicle 200 and a vertical axis 206 of the vehicle 200. The vehicle 200 can include, for example, a processor 208 and a memory 210.

Additionally, for example, the vehicle 200 can include a dashboard 212. For example, a user interface 214 can be installed in the dashboard 212. The user interface 214 can be communicably connected to the processor 208. For example, a control element 216 (e.g., a button, a graphical control element, or the like) can be included on the user interface 214.

Additionally, for example, the vehicle 200 can further include one or more of an imaging device 218 (e.g., a camera) or a microphone 220. The one or more of the imaging device 218 or the microphone 220 can be communicably connected to the processor 208.

Additionally, for example, the vehicle 200 can further include an inertial motion unit (IMU) 222. The inertial motion unit (IMU) 222 can be communicably connected to the processor 208.

Additionally, for example, the vehicle 200 can further include a steering mechanism 224. The steering mechanism 224 can be connected between a steering operator interface 226 and one or more axles 228 to which one or more wheels 230 are connected.

Additionally, for example, the vehicle 200 can further include a lane keeping assist (LKA) system 232. The lane keeping assist (LKA) system 232 can be communicably connected to the processor 208 and the steering mechanism 224. The lane keeping assist (LKA) system 232 can be configured to control the steering mechanism 224 to change a degree of variation of a lateral position of the vehicle 200 within a lane.

Additionally, for example, the vehicle 200 can further include an accelerating operator interface 234 or a braking operator interface 236.

Additionally, for example, the vehicle 200 can further include an adaptive cruise control (ACC) system 238. The adaptive cruise control (ACC) system 238 can be communicably connected to the processor 208, the accelerating operator interface 234, and the braking operator interface 236. The adaptive cruise control (ACC) system 238 can be configured to control one or more of the accelerating operator interface 234 or the braking operator interface 236 to change one or more of a rate of acceleration of the vehicle 200, a rate of deceleration of the vehicle 200, or a speed of the vehicle 200.

Additionally, for example, the vehicle 200 can further include an autonomous driving system 240. The autonomous driving system 240 can be communicably connected to the processor 208. The autonomous driving system 240 can be configured to control a trajectory of the vehicle 200.

Additionally, for example, the vehicle 200 can further include a lidar device 242. The lidar device 242 can be communicably connected to the processor 208.

Additionally, for example, a child safety seat 244 can be installed in the vehicle 200.

Figure 3:
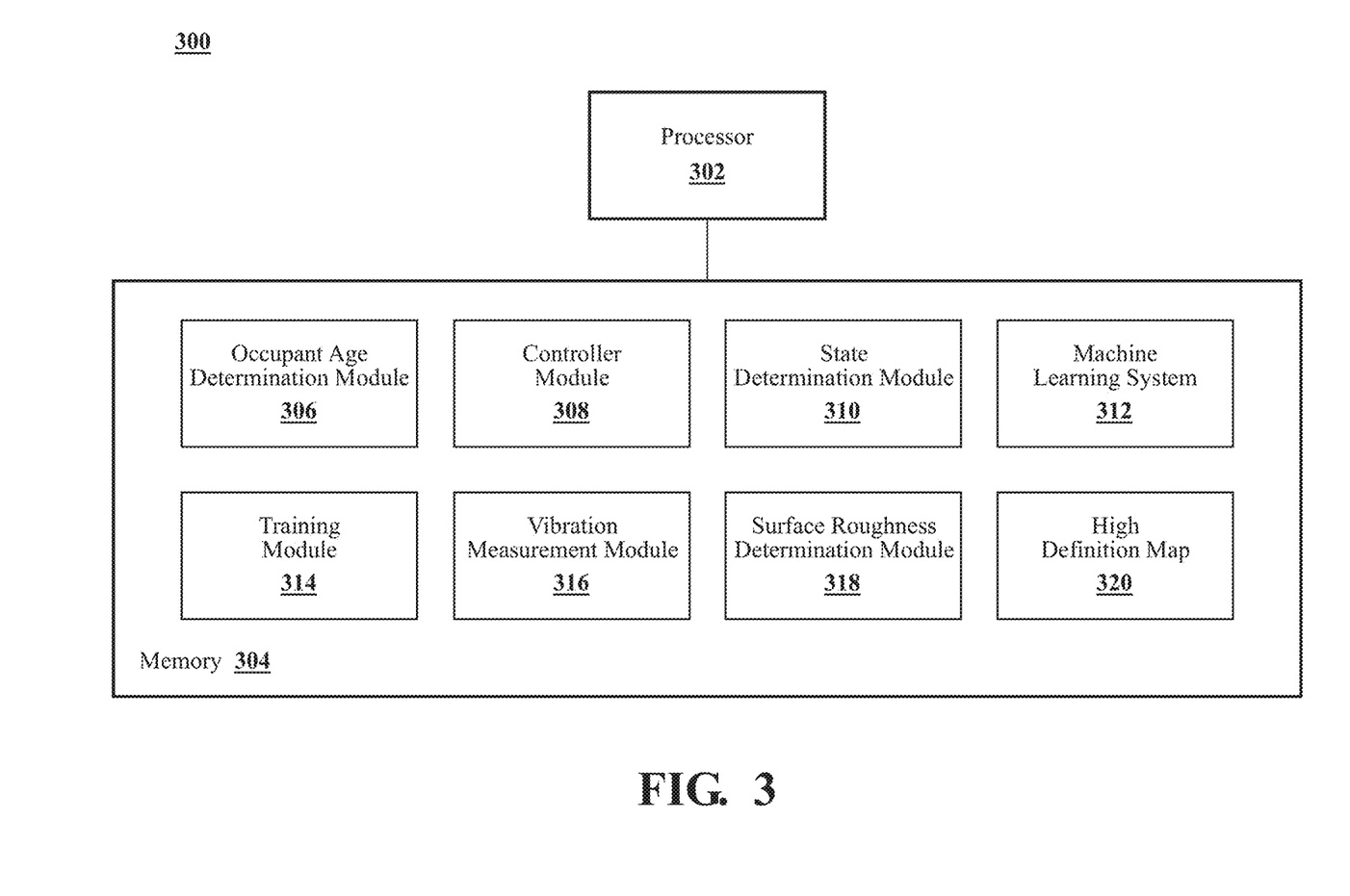
FIG. 3 includes a block diagram that illustrates an example of a system for causing a vibration within a vehicle to change a degree of somnolence of an occupant of the vehicle, according to the disclosed technologies.

FIG. 3 includes a block diagram that illustrates an example of a system 300 for causing a vibration within a vehicle to change a degree of somnolence of an occupant of the vehicle, according to the disclosed technologies. The system 300 can include, for example, a processor 302 and a memory 304. The memory 304 can be communicably connected to the processor 302. For example, the memory 304 can store an occupant age discrimination module 306 and a controller module 308.

For example, the occupant age discrimination module 306 can include instructions that function to control the processor 302 to determine that a first occupant of the vehicle is a child. For example, the child can be an infant.

For example, the controller module 308 can include instructions that function to control the processor 302 to cause, in response to a determination that the first occupant is the child, the vehicle to move in a manner to induce the vibration within the vehicle to change the degree of somnolence (e.g., sleepiness) of the first occupant from an undesired state, of the degree of somnolence, to a desired state of the degree of somnolence. For example, the undesired state can be awake, and the desired state can be asleep. Alternatively, for example, the undesired state can be asleep, and the desired state can be awake. For example, the vibration induced within the vehicle can be characterized as causing a shakiness within the vehicle. For example, the shakiness can be characterized as a slight and irregular vibration. Alternatively, for example, the shakiness can be characterized as a vibration that has a large amplitude, but a low frequency.

In an implementation of the disclosed technologies, the instructions to determine that the first occupant of the vehicle is the child can include one or more of: (1) instructions to determine, in response to an activation of a control element on a user interface, that the first occupant of the vehicle is the child or (2) instructions to determine, in response to a detection, by a sensor, of the first occupant within the vehicle, that the first occupant of the vehicle is the child. For example, the sensor can include one or more of an imaging device, a microphone, or the like. For example, if a child safety seat has been installed in the vehicle, then the first occupant of the vehicle can be determined to be the child based on a detection of the first occupant in the child safety seat. With reference to FIG. 2, for example, the control element on the user interface can be the control element 216 on the user interface 214. For example, the sensor can be one or more of the imaging device 218 (e.g., a camera) or the microphone 220 and the child safety seat can be the child safety seat 244.

Returning to FIG. 3, in another implementation of the disclosed technologies, the memory 304 can further store a state determination module 310. The state determination module 310 can include instructions that function to control the processor 302 to receive, from a sensor, information related to the degree of somnolence of the first occupant. For example, the sensor can include one or more of an imaging device, a microphone, or the like. The state determination module 310 can further include instructions to determine, based on the information, the degree of somnolence of the first occupant. With reference to FIG. 2, for example, the one or more of the imaging device or the microphone can be one or more of the imaging device 218 (e.g., a camera) or the microphone 220. For example, the information can include one or more of information about a position of an eyelid of the first occupant, information about a rate of motion of a part of a body of the first occupant, information about a degree of loudness of a sound produced by the first occupant, or the like. For example, if the first occupant is an infant and the infant is in the undesired state of being awake, then: (1) an eyelid of the infant is likely to be open, (2) a motion of a part of a body (e.g., an arm, a leg, etc.) of the infant is likely to be at a higher rate than if the infant was asleep, and (3) a sound produced by the infant (e.g., crying) is likely to be at a high degree of loudness. In contrast, for example, if the first occupant is an infant and the infant is in the desired state of being asleep, then: (1) the eyelid of the infant is likely to be closed, (2) the motion of the part of the body (e.g., the arm, the leg, etc.) of the infant is likely to be at a lower rate than if the infant was awake, and (3) the sound produced by the infant (e.g., snoring) is likely to be at a low degree of loudness.

Returning to FIG. 3, in a variation of this other implementation, the memory 304 can further store a machine learning system 312. For example, the instructions to determine, based on the information, the degree of somnolence of the first occupant can include instructions to process, with the machine learning system 312, the information. Additionally, for example, the memory 304 can further store a training module 314. The training module 314 can include instructions that function to control the processor 302 to train the machine learning system 312 with training data that include one or more of: (1) known corresponding information associated with the undesired state or (2) known corresponding information associated with the desired state. For example, if the undesired state is awake, then the training data can include known information about a position of an eyelid of an occupant that is awake, known information about a rate of motion of a part of a body of an occupant that is awake, known information about a degree of loudness of a sound produced by an occupant that is awake, or the like. For example, if the desired state is asleep, then the training data can include known information about a position of an eyelid of an occupant that is asleep, known information about a rate of motion of a part of a body of an occupant that is asleep, known information about a degree of loudness of a sound produced by an occupant that is asleep, or the like. Additionally, for example, the first occupant can be a specific occupant and the one or more of: (1) the known corresponding information associated with the undesired state or (2) the known corresponding information associated with the desired state can include one or more of: (1) known corresponding information associated with the undesired state of the specific occupant or (2) known corresponding information associated with the desired state of the specific occupant. That is, the machine learning system 312 can be trained with training data obtained from the specific occupant.

In yet another implementation of the disclosed technologies, the instructions to cause the vehicle to move in the manner to induce the vibration can include instructions to cause the vehicle to move in the manner to induce the vibration so that a measure of the vibration is greater than a first threshold vibration. Additionally, in a variation of this yet other implementation, the memory 304 can further store a vibration measurement module 316. The vibration measurement module 316 can include instructions that function to control the processor 302 to receive, from an inertial motion unit (IMU), the measure of the vibration. For example, the vibration can be measured as a change in a rate of acceleration of the vehicle, in meters per second squared, along one or more of a lateral axis of the vehicle, a longitudinal axis of the vehicle, or a vertical axis of the vehicle. With reference to FIG. 2, for example, the inertial motion unit (IMU) can be the inertial motion unit (IMU) 222, the lateral axis can be the lateral axis 204, the longitudinal axis can be the longitudinal axis 202, and the vertical axis can be the vertical axis 206. Additionally, in another variation of this yet other implementation, the first occupant can be a first specific occupant and the first threshold vibration can be a threshold vibration associated with the first specific occupant. For example, having the measure of the vibration be greater than the first threshold vibration can be preferable for changing the degree of somnolence of the first occupant from the undesired state to the desired state. Additionally, for example, the measure of the vibration can be less than a second threshold vibration. The second threshold vibration can be a threshold vibration associated with a second specific occupant of the vehicle. A measure of the vibration being greater than the second threshold vibration can be associated with an undesired state of the second specific occupant (e.g., uncomfortable, nauseous, etc.). That is, having the measure of the vibration be between the first threshold vibration and the second threshold vibration can be preferable for changing the degree of somnolence of the first occupant from the undesired state (e.g., awake) to the desired state (e.g., asleep) while preventing the second specific occupant from being in the undesired state of the second specific occupant (e.g., uncomfortable, nauseous, etc.).

In still another implementation of the disclosed technologies, the vibration can include one or more of: (1) a vibration in a direction along a lateral axis of the vehicle, (2) a vibration in a direction along a longitudinal axis of the vehicle, or (3) a vibration in a direction along a vertical axis of the vehicle. With reference to FIG. 2, for example, the lateral axis can be the lateral axis 204, the longitudinal axis can be the longitudinal axis 202, and the vertical axis can be the vertical axis 206.

In a variation of this still other implementation, the instructions to cause the vehicle to move in the manner to induce the vibration can include instructions to cause the vehicle to move in a manner to induce the vibration in the direction along the lateral axis of the vehicle. Additionally, for example, the instructions to cause the vehicle to move in the manner to induce the vibration in the direction along the lateral axis of the vehicle can include instructions to control a steering mechanism of the vehicle to change a degree of variation of a lateral position of the vehicle within a lane. For example, the vehicle can include a lane keeping assist (LKA) system. For example, the lane keeping assist (LKA) system can be configured to control the steering mechanism to change the degree of variation of the lateral position of the vehicle within a lane. With reference to FIG. 2, for example, the steering mechanism can be the steering mechanism 224 and the lane keeping assist (LKA) system can be the lane keeping assist (LKA) system 232. With reference to FIGS. 1 and 2, for example, the vehicle 200 can be the second vehicle 138. For example, the instructions to control the steering mechanism 224 of the second vehicle 138 can originally operate to maintain the degree of variation of the lateral position of the second vehicle 138 within the lane #1 116 to be within $\Delta s_1$ of a centerline 148 of the lane #1 116, but, to induce the vibration in the direction along the lateral axis 204 of the second vehicle 138, change to operate to maintain the degree of variation of the lateral position of the second vehicle 138 within the lane #1 116 to be within $\Delta s_2$ of the centerline 148, $\Delta s_2$ being greater than $\Delta s_1$.

In another variation of this still other implementation, the instructions to cause the vehicle to move in the manner to induce the vibration can include instructions to cause the vehicle to move in a manner to induce the vibration in the direction along the longitudinal axis of the vehicle. Additionally, for example, the instructions to cause the vehicle to move in the manner to induce the vibration in the direction along the longitudinal axis of the vehicle can include instructions to control one or more of an accelerating operator interface of the vehicle or a braking operator interface of the vehicle to change at one or more of a rate of acceleration of the vehicle or a rate of deceleration of the vehicle. For example, the vehicle can include an adaptive cruise control (ACC) system. For example, the adaptive cruise control (ACC) system can be configured to control one or more of the accelerating operator interface or the braking operator interface to change one or more of the rate of acceleration of the vehicle, the rate of deceleration of the vehicle, or a speed of the vehicle. With reference to FIG. 2, for example, the accelerating operator interface can be the accelerating operator interface 234, the braking operator interface can be the braking operator interface 236, and the adaptive cruise control (ACC) system can be the adaptive cruise control (ACC) system 238.

In yet another variation of this still other implementation, the instructions to cause the vehicle to move in the manner to induce the vibration can include instructions to cause the vehicle to move in a manner to induce the vibration in the direction along the vertical axis of the vehicle.

Additionally, for example, the instructions to cause the vehicle to move in the manner to induce the vibration in the direction along the vertical axis of the vehicle can include instructions to control an accelerating operator interface of the vehicle to increase a speed of the vehicle. For example, the vehicle can include an adaptive cruise control (ACC) system. For example, the adaptive cruise control (ACC) system can be configured to control one or more of the accelerating operator interface or the braking operator interface to change one or more of the rate of acceleration of the vehicle, the rate of deceleration of the vehicle, or the speed of the vehicle. With reference to FIG. 2, for example, the accelerating operator interface can be the accelerating operator interface 234 and the adaptive cruise control (ACC) system can be the adaptive cruise control (ACC) system 238.

Additionally or alternatively, for example, the instructions to cause the vehicle to move in the manner to induce the vibration in the direction along the vertical axis of the vehicle can include instructions to control a trajectory of the vehicle to cause the vehicle to traverse within a first lane rather than within a second lane. A measure of a roughness of a surface of a road in the first lane can be greater than a measure of the roughness of the surface of the road in the second lane. For example, the vehicle can include an autonomous driving system. For example, the autonomous driving system can be configured to control a trajectory of the vehicle. With reference to FIG. 2, for example, the autonomous driving system can be the autonomous driving system 240. With reference to FIGS. 1 and 2, for example, the vehicle 200 can be the second vehicle 138. For example, because the lane #2 114 can have the surface deteriorations 134, the measure of the roughness of the surface of the road in the lane #2 114 can be greater than the measure of the roughness of the surface of the road in the lane #1 116. For example, the instructions to control a trajectory 150 of the second vehicle 138 can originally operate to cause the second vehicle 138 to traverse within the lane #1 116, but, to induce the vibration in the direction along the vertical axis 206 of the second vehicle 138, change to operate to cause the second vehicle 138 to traverse within the lane #2 114.

Returning to FIG. 3, additionally, for example, the memory 304 can further store a surface roughness determination module 318. The surface roughness determination module 318 can include instructions that function to control the processor 302 to determine information about the measure of the roughness of the surface of the road in the first lane and the measure of the roughness of the surface of the road in the second lane. For example, the roughness can be measured according to the International Roughness Index in which the roughness is measured as a vertical displacement (e.g., in millimeters) of a surface, associated with a cause of the roughness (e.g., surface deteriorations), of a road in a lane per length (e.g., in meters) of the lane. That is, the roughness can be measured in millimeters per meter. For example, the instructions to determine the information can include one or more of: (1) instructions to determine the information from information included in a high definition map, (2) instructions to determine the information from readings from a lidar device, or (3) instructions to determine the information from data produced by an inertial motion unit (IMU). For example, the memory 304 can further store a high definition map 320. With reference to FIG. 2, for example, the lidar device can be the lidar device 242 and the inertial motion unit (IMU) can be the inertial motion unit (IMU) 222.

In even another implementation, the instructions to cause the vehicle to move in the manner to induce the vibration can include instructions to control a trajectory of the vehicle to cause the vehicle to move in a pattern.

For example, the pattern can be configured to cause the vibration to be random. With reference to FIG. 1, for example, because the lane #2 114 can have the surface deteriorations 134 and because a distribution of the surface deteriorations 134 can be random, the instructions to control the trajectory 150 of the second vehicle 138 to traverse within the lane #2 114 can cause the second vehicle 138 to move in a pattern configured to cause the vibration to be random.

Alternatively, for example, the pattern can be configured to cause the vibration to be periodic. With reference to FIG. 1, for example, because: (1) the first expansion joint 124, the second expansion joint 126, and the third expansion joint 128 can be installed in the surface of the first road 102. (2) the measure of the roughness of the surface of the first road 102 at locations of the first expansion joint 124, the second expansion joint 126, and the third expansion joint 128 can be greater than the measure of the roughness of the surface of the first road 102 in other locations, and (3) the measure of the spacing 130 between the first expansion joint 124 and the second expansion joint 126 can be the same as the measure of the spacing 132 between the second expansion joint 126 and the third expansion joint 128, the instructions to control a trajectory 152 of the first vehicle 136 to periodically change between traversing within the lane #2 112 and traversing within the lane #1 110 can cause the first vehicle 136 to move in a pattern configured to cause the vibration to be periodic.

In a variation of this even other implementation, the first occupant can be a specific occupant and the pattern can be a pattern designed for the specific occupant. For example, having the pattern be the pattern designed for the specific occupant can be preferable for causing the state of the specific occupant to be changed to the desired state.

Figure 4:
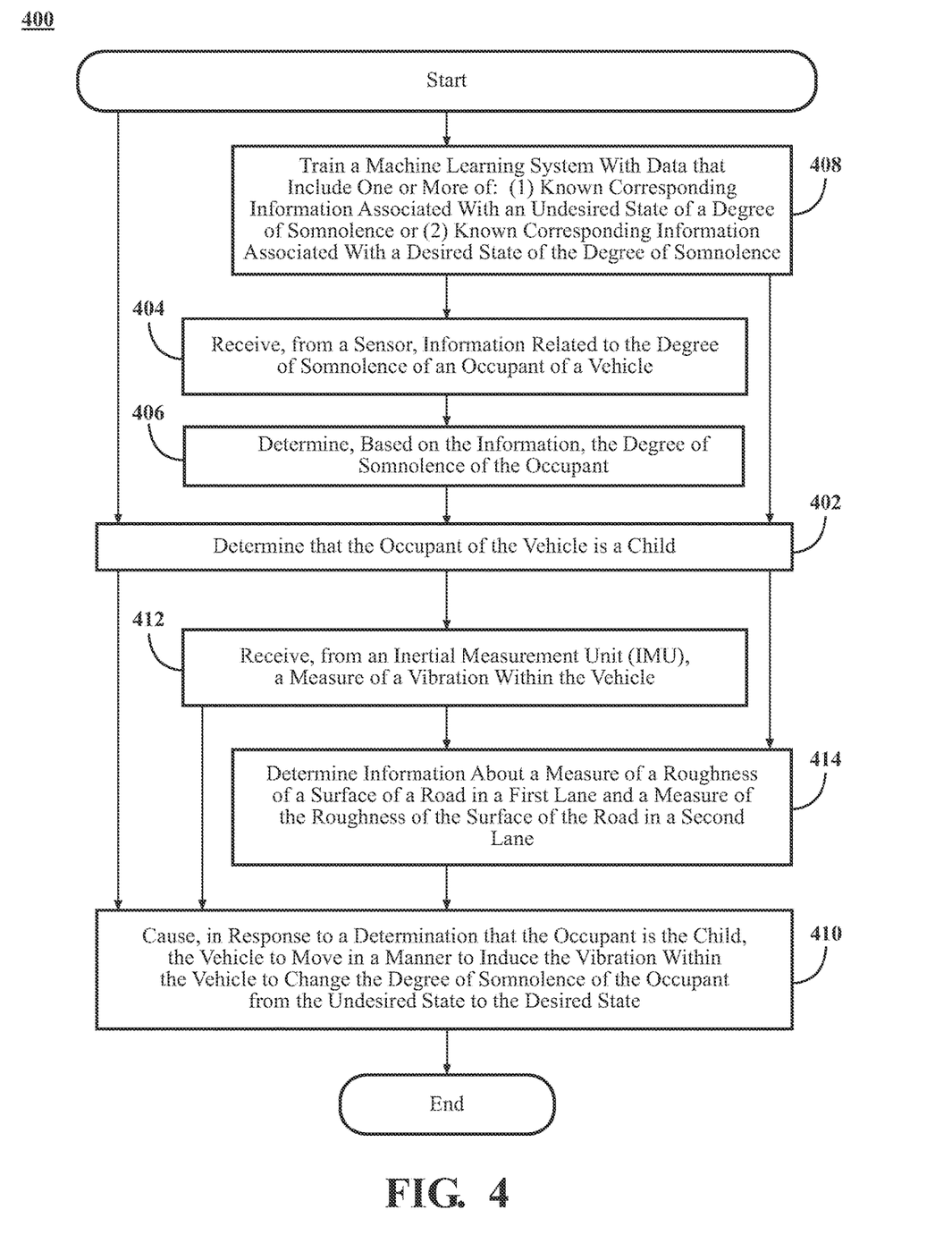
FIG. 4 includes a flow diagram that illustrates an example of a method that is associated with causing a vibration within a vehicle to change a degree of somnolence of an occupant of the vehicle, according to the disclosed technologies.

FIG. 4 includes a flow diagram that illustrates an example of a method 400 that is associated with causing a vibration within a vehicle to change a degree of somnolence of an occupant of the vehicle, according to the disclosed technologies. Although the method 400 is described in combination with the system 300 illustrated in FIG. 3, one of skill in the art understands, in light of the description herein, that the method 400 is not limited to being implemented by the system 300 illustrated in FIG. 3. Rather, the system 300 illustrated in FIG. 3 is an example of a system that may be used to implement the method 400. Additionally, although the method 400 is illustrated as a generally serial process, various aspects of the method 400 may be able to be executed in parallel.

In the method 400, at an operation 402, for example, the occupant age discrimination module 306 can determine that a first occupant of the vehicle is a child. For example, the child can be an infant.

In an implementation of the disclosed technologies, the operation 402 can include, for example, one or more of: (1) determining, in response to an activation of a control element on a user interface, that the first occupant of the vehicle is the child or (2) determining, in response to a detection, by a sensor, of the first occupant within the vehicle, that the first occupant of the vehicle is the child. For example, the sensor can include one or more of an imaging device, a microphone, or the like. For example, if a child safety seat has been installed in the vehicle, then the first occupant of the vehicle can be determined to be the child based on a detection of the first occupant in the child safety seat.

In another implementation of the disclosed technologies, at an operation 404, for example, the state determination module 310 can receive, from a sensor, information related to the degree of somnolence of the first occupant. For example, the sensor can include one or more of an imaging device, a microphone, or the like.

In this other implementation, at an operation 406, the state determination module 310 can determine, based on the information, the degree of somnolence of the first occupant. For example, the information can include one or more of information about a position of an eyelid of the first occupant, information about a rate of motion of a part of a body of the first occupant, information about a degree of loudness of a sound produced by the first occupant, or the like.

In a variation of this other implementation, the operation 406 can include processing, with the machine learning system 312, the information. At an operation 408, for example, the training module 314 can train the machine learning system 312 with training data that include one or more of: (1) known corresponding information associated with an undesired state of the degree of somnolence or (2) known corresponding information associated with a desired state of the degree of somnolence. For example, the undesired state can be awake, and the desired state can be asleep. Alternatively, for example, the undesired state can be asleep, and the desired state can be awake. Additionally, for example, the first occupant can be a specific occupant and the one or more of: (1) the known corresponding information associated with the undesired state or (2) the known corresponding information associated with the desired state can include one or more of: (1) known corresponding information associated with the undesired state of the specific occupant or (2) known corresponding information associated with the desired state of the specific occupant.

At an operation 410, for example, the controller module 308 can cause, in response to a determination that the first occupant is the child, the vehicle to move in a manner to induce the vibration within the vehicle to change the degree of somnolence of the first occupant from the undesired state to the desired state. For example, the vibration induced within the vehicle can be characterized as causing a shakiness within the vehicle. For example, the shakiness can be characterized as a slight and irregular vibration. Alternatively, for example, the shakiness can be characterized as a vibration that has a large amplitude, but a low frequency.

In yet another implementation of the disclosed technologies, the operation 410 can include causing the vehicle to move in the manner to induce the vibration so that a measure of the vibration is greater than a first threshold vibration. Additionally, in a variation of this yet other implementation, at an operation 412, the vibration measurement module 316 can receive, from an inertial motion unit (IMU), the measure of the vibration. Additionally, in another variation of this yet other implementation, the first occupant can be a first specific occupant and the first threshold vibration can be a threshold vibration associated with the first specific occupant. Additionally, for example, the measure of the vibration can be less than a second threshold vibration. The second threshold vibration can be a threshold vibration associated with a second specific occupant of the vehicle. A measure of the vibration being greater than the second threshold vibration can be associated with an undesired state of the second specific occupant (e.g., uncomfortable, nauseous, etc.).

In still another implementation of the disclosed technologies, the vibration can include one or more of: (1) a vibration in a direction along a lateral axis of the vehicle, (2) a vibration in a direction along a longitudinal axis of the vehicle, or (3) a vibration in a direction along a vertical axis of the vehicle.

In a variation of this still other implementation, the operation 410 can include causing the vehicle to move in a manner to induce the vibration in the direction along the lateral axis of the vehicle. Additionally, for example, the operation 410 can include controlling a steering mechanism of the vehicle to change a degree of variation of a lateral position of the vehicle within a lane.

In another variation of this still other implementation, the operation 410 can include causing the vehicle to move in a manner to induce the vibration in the direction along the longitudinal axis of the vehicle. Additionally, for example, the operation 410 can include controlling one or more of an accelerating operator interface of the vehicle or a braking operator interface of the vehicle to change at one or more of a rate of acceleration of the vehicle or a rate of deceleration of the vehicle.

In yet another variation of this still other implementation, the operation 410 can include causing the vehicle to move in a manner to induce the vibration in the direction along the vertical axis of the vehicle.

Additionally, for example, the operation 410 can include controlling an accelerating operator interface of the vehicle to increase a speed of the vehicle.

Additionally or alternatively, for example, the operation 410 can include controlling a trajectory of the vehicle to cause the vehicle to traverse within a first lane rather than within a second lane. A measure of a roughness of a surface of a road in the first lane can be greater than a measure of the roughness of the surface of the road in the second lane.

Additionally, at an operation 414, for example, the surface roughness determination module 318 can determine information about the measure of the roughness of the surface of the road in the first lane and the measure of the roughness of the surface of the road in the second lane. For example, the operation 414 can include one or more of: (1) determining the information from information included in a high definition map, (2) determining the information from readings from a lidar device, or (3) determining the information from data produced by an inertial motion unit (IMU).

In even another implementation, the operation 410 can include controlling a trajectory of the vehicle to cause the vehicle to move in a pattern. For example, the pattern can be configured to cause the vibration to be random. Alternatively, for example, the pattern can be configured to cause the vibration to be periodic. In a variation of this even other implementation, the first occupant can be a specific occupant and the pattern can be a pattern designed for the specific occupant.

Figure 5:
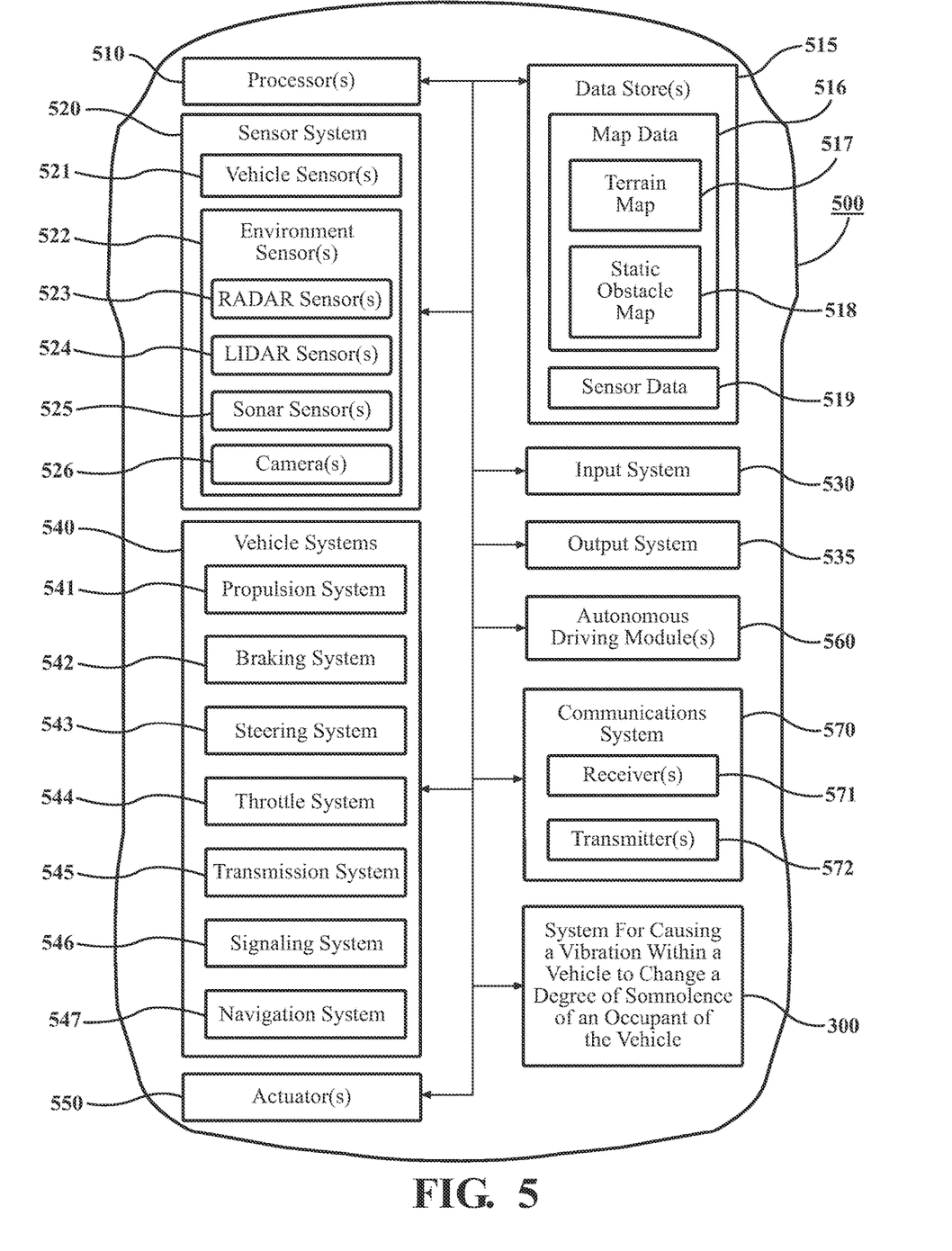
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles. For example, functions and/or operations of one or more of the first vehicle 136 (illustrated in FIG. 1), the second vehicle 138 (illustrated in FIG. 1), or the vehicle 200 (illustrated in FIG. 2) can be realized by the vehicle 500.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, a communications system 570, and the system 300 for causing a vibration within a vehicle to change a degree of somnolence of an occupant of the vehicle.

In one or more arrangements, the one or more processors 510 can be a main processor of the vehicle 500. For example, the one or more processors 510 can be an electronic control unit (ECU). For example, functions and/or operations of one or more of the processor 208 (illustrated in FIG. 2) or the processor 302 (illustrated in FIG. 3) can be realized by the one or more processors 510.

The one or more data stores 515 can store, for example, one or more types of data. The one or more data stores 515 can include volatile memory and/or non-volatile memory. For example, functions and/or operations of one or more of the memory 210 (illustrated in FIG. 2) or the memory 304 (illustrated in FIG. 3) can be realized by the one or more data stores 515. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed. For example, functions and/or operations of one or more of the high definition map 320 (illustrated in FIG. 3) can be realized by the map data 516.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Additionally or alternatively, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500. For example, functions and/or operations of one or more of the imaging device 218 (e.g., a camera) (illustrated in FIG. 2) or the microphone 220 (illustrated in FIG. 2) can be realized by the one or more vehicle sensors 521.

Additionally or alternatively, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map. For example, functions and/or operations of the lidar device 242 (illustrated in FIG. 2) can be realized by the one or more lidar sensors 524.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger). For example, functions and/or operations of the user interface 214 (illustrated in FIG. 2) can be realized by the input system 530.

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed. For example, functions and/or operations of the braking operator interface 236 (illustrated in FIG. 2) can be realized by the braking system 542. For example, functions and/or operations of the steering operator interface 226 (illustrated in FIG. 2) can be realized by the steering system 543. For example, functions and/or operations of the accelerating operator interface 234 (illustrated in FIG. 2) can be realized by the throttle system 544.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated. For example, functions and/or operations of the autonomous driving system 240 (illustrated in FIG. 2) can be realized by the automated driving modules 560.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 510, the one or more data stores 515, and the communications system 570 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Additionally or alternatively, one or more of the modules can be executed on and/or distributed among other processing systems to which the one or more processors 510 can be operatively connected. The modules can include instructions (e.g., program logic) executable by the one or more processors 510. Additionally or alternatively, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
an occupant age discrimination module including instructions that, when executed by the processor, cause the processor to determine that a first occupant of a vehicle is a child; and
a controller module including instructions that, when executed by the processor, cause the processor to control, in response to a determination that the first occupant is the child, a lane keeping assist system to control a steering mechanism to change a degree of variation of a lateral position of the vehicle within a lane to cause the vehicle to move in a manner to induce the vibration within the vehicle to change a degree of somnolence of the first occupant from an undesired state, of the degree of somnolence, to a desired state of the degree of somnolence.

2. The system of claim 1, wherein the memory further stores a state determination module, the state determination module including instructions that, when executed by the processor, cause the processor to:
receive, from a sensor, information related to the degree of somnolence of the first occupant; and
determine, based on the information, the degree of somnolence of the first occupant.

3. The system of claim 2, wherein the instructions to determine, based on the information, the degree of somnolence of the first occupant include instructions to process, with a machine learning system, the information.

4. The system of claim 3, wherein the memory further stores a training module, the training module including instructions that, when executed by the processor, cause the processor to train the machine learning system with training data that include at least one of known corresponding information associated with the undesired state or known corresponding information associated with the desired state.

5. The system of claim 4, wherein:
the first occupant is a specific occupant, and
the at least one of:
the known corresponding information associated with the undesired state or
the known corresponding information associated with the desired state comprises at least one of:
known corresponding information associated with the undesired state of the specific occupant or
known corresponding information associated with the desired state of the specific occupant.

6. The system of claim 1, wherein the instructions to cause the vehicle to move in the manner to induce the vibration include instructions to cause the vehicle to move in the manner to induce the vibration so that a measure of the vibration is greater than a first threshold vibration.

7. The system of claim 6, wherein:
the first occupant is a first specific occupant, and
the first threshold vibration is a threshold vibration associated with the first specific occupant.

8. The system of claim 7, wherein:
the measure of the vibration is less than a second threshold vibration,
the second threshold vibration is a threshold vibration associated with a second specific occupant of the vehicle, and
a measure of the vibration greater than the second threshold vibration is associated with an undesired state of the second specific occupant.

9. The system of claim 1, wherein:
the vibration includes at least one of a vibration in a direction along a lateral axis of the vehicle, a vibration in a direction along a longitudinal axis of the vehicle, or a vibration in a direction along a vertical axis of the vehicle, and
the instructions to cause the vehicle to move in the manner to induce the vibration include instructions to cause the vehicle to move in a manner to induce the vibration in the direction along the lateral axis of the vehicle.

10. The system of claim 9, wherein the instructions to cause the vehicle to move in the manner to induce the vibration in the direction along the lateral axis of the vehicle include instructions to control the steering mechanism of the vehicle to change a degree of variation of a lateral position of the vehicle within a lane.

11. The system of claim 1, wherein:
the vibration includes at least one of a vibration in a direction along a lateral axis of the vehicle, a vibration in a direction along a longitudinal axis of the vehicle, or a vibration in a direction along a vertical axis of the vehicle, and
the instructions to cause the vehicle to move in the manner to induce the vibration include instructions to cause the vehicle to move in a manner to induce the vibration in the direction along the longitudinal axis of the vehicle.

12. The system of claim 11, wherein the instructions to cause the vehicle to move in the manner to induce the vibration in the direction along the longitudinal axis of the vehicle include instructions to control at least one of the accelerating operator interface of the vehicle or the braking operator interface of the vehicle to change at least one of a rate of acceleration of the vehicle or a rate of deceleration of the vehicle.

13. The system of claim 1, wherein:
the vibration includes at least one of a vibration in a direction along a lateral axis of the vehicle, a vibration in a direction along a longitudinal axis of the vehicle, or a vibration in a direction along a vertical axis of the vehicle, and
the instructions to cause the vehicle to move in the manner to induce the vibration include instructions to cause the vehicle to move in a manner to induce the vibration in the direction along the vertical axis of the vehicle.

14. The system of claim 13, wherein the instructions to cause the vehicle to move in the manner to induce the vibration in the direction along the vertical axis of the vehicle include instructions to control a trajectory of the vehicle to cause the vehicle to traverse within a first lane rather than within a second lane, a measure of a roughness of a surface of a road in the first lane being greater than a measure of the roughness of the surface of the road in the second lane.

15. The system of claim 14, wherein the memory further stores a surface roughness determination module, the surface roughness determination module including instructions that, when executed by the processor, cause the processor to determine information about the measure of the roughness of the surface of the road in the first lane and the measure of the roughness of the surface of the road in the second lane.

16. The system of claim 15, wherein the instructions to determine the information include at least one of:
instructions to determine the information from information included in a high definition map,
instructions to determine the information from readings from a lidar device, or
instructions to determine the information from data produced by an inertial motion unit.

17. The system of claim 14, wherein the instructions to control the trajectory of the vehicle to cause the vehicle to traverse within the first lane rather than within the second lane include instructions to control an autonomous driving system to control the trajectory of the vehicle to cause the vehicle to traverse within the first lane rather than within the second lane.

18. The system of claim 1, wherein:
the instructions to cause the vehicle to move in the manner to induce the vibration include instructions to control a trajectory of the vehicle to cause the vehicle to move in a pattern,
the first occupant is a specific occupant, and
the pattern is a pattern designed for the specific occupant.

19. The system of claim 18, wherein the instructions to control the trajectory of the vehicle to cause the vehicle to move in the pattern include instructions to control an autonomous driving system to control the trajectory of the vehicle to cause the vehicle to move in the pattern.

20. The system of claim 1, wherein the instructions to cause the vehicle to move in the manner to induce the vibration include instructions to control an adaptive cruise control system to control the at least one of the accelerating operator interface or the braking operator interface to change at least one of a rate of acceleration of the vehicle, a rate of deceleration of the vehicle, or a speed of the vehicle.

21. A method, comprising:
determining, by a processor, that an occupant of a vehicle is a child; and
controlling, by the processor and in response to a determination that the occupant is the child, a lane keeping assist system to control a steering mechanism to change a degree of variation of a lateral position of the vehicle within a lane to cause the vehicle to move in a manner to induce a vibration within the vehicle to change a degree of somnolence of the occupant from an undesired state, of the degree of somnolence, to a desired state of the degree of somnolence.

22. The method of claim 21, wherein the determining that the occupant of the vehicle is the child comprises at least one of:
determining, in response to an activation of a control element on a user interface, that the occupant of the vehicle is the child, or
determining, in response to a detection, by a sensor, of the occupant within the vehicle, that the occupant of the vehicle is the child.

23. A non-transitory computer-readable medium for causing a vibration within a vehicle to change a degree of somnolence of an occupant of the vehicle, the non-transitory computer-readable medium including instructions that, when executed by one or more processors, cause the one or more processors to:
determine that the occupant of the vehicle is a child; and
control, in response to a determination that the occupant is the child, a lane keeping assist system to control a steering mechanism to change a degree of variation of a lateral position of the vehicle within a lane to cause the vehicle to move in a manner to induce the vibration within the vehicle to change the degree of somnolence of the occupant from an undesired state, of the degree of somnolence, to a desired state of the degree of somnolence.

* * * * *